(12) United States Patent  (10) Patent No.: US 8,930,180 B1
Murray et al.  (45) Date of Patent: Jan. 6, 2015

(54) RAPID SCENARIO GENERATION USING NATURAL LANGUAGE UNDERSTANDING

(75) Inventors: William R Murray, Seattle, WA (US); Brandt Dargue, Kirkwood, MO (US); John J. Sanders, Radcliff, KY (US)

(73) Assignee: The Boeing Company, Chicago, IL (US)

(*) Notice: Subject to any disclaimer, the term of this patent is extended or adjusted under 35 U.S.C. 154(b) by 157 days.

(21) Appl. No.: 13/586,756

(22) Filed: Aug. 15, 2012

(51) Int. Cl.
G06F 17/27  (2006.01)
G06F 17/20  (2006.01)
G06F 17/21  (2006.01)

(52) U.S. Cl.
USPC ...................................... 704/9; 704/1; 704/10

(58) Field of Classification Search
USPC ................ 704/9; 703/6–8, 13–22; 434/11–71
See application file for complete search history.

(56) References Cited

U.S. PATENT DOCUMENTS

| | | | |
|---|---|---|---|
| 4,725,956 A * | 2/1988 | Jenkins ............................. | 701/2 |
| 6,128,594 A * | 10/2000 | Gulli et al. ..................... | 704/244 |
| 6,606,544 B2 * | 8/2003 | Glenn et al. ...................... | 701/3 |
| 6,720,890 B1 * | 4/2004 | Ezroni et al. .................. | 340/945 |
| 7,606,715 B1 * | 10/2009 | Krenz ............................ | 704/275 |
| 7,937,349 B2 * | 5/2011 | Pucher ............................ | 706/45 |
| 2006/0271245 A1 * | 11/2006 | Herman ............................ | 701/1 |
| 2007/0277111 A1 * | 11/2007 | Bennett et al. ................. | 715/763 |
| 2009/0244071 A1 * | 10/2009 | Kuo et al. ...................... | 345/473 |

OTHER PUBLICATIONS

R. Schwitter. Controlled Natural Languages for Knowledge Representation. Coling 2010, Aug. 23-27, 2010, Beijing, China. Notes: A general overview of CNLS and mentions Boeing's proprietary CNL called CPL (Computer Processable Language).
Papers that Describe Controlled Natural Language: Measuring the Translatability of Simplified English in Procedural Documents; Spyridakis, J.H. Holmback, H. & Shubert, S.K. IEEE Trans. Prof. Comm., vol. 40, 1997, pp. 4-12 Note: Concerns CNLs used fo foreign language translation.
Gunning, D., Chaudhri, V., Clark, P. et al., Project Halo Update Progress Toward Digital Aristotle. AI Magazine (to appear), 2010. Notes: CNLs used to represent knowledge and answer questions in physics, biology, and chemistry domains.

* cited by examiner

*Primary Examiner* — Jesse Pullias
(74) *Attorney, Agent, or Firm* — Weiss & Moy, P.C.

(57) ABSTRACT

A generator for providing highly interactive, immersive training and mission rehearsal scenarios for war fighters and leaders on the job is provided. Through natural language understanding, the automation of such scenarios may be enabled and quickly created to ensure effectiveness, consistency, completeness and relevance. New tactical simulations may be added to the system by writing software adapters to down-translate from an abstract scenario model to the specific tactical simulation and its delivery platform. Finally, this same approach of interpreting written problem or task specifications may be extended to instruction in non-military domains that also leverage system or device simulations.

15 Claims, 7 Drawing Sheets

RAPID SCENARIO GENERATION USING NATURAL LANGUAGE UNDERSTANDING

BACKGROUND

Embodiments of this disclosure generally relate to scenario generation, and more particularly, to rapid generation of highly interactive, immersive training and mission rehearsal scenarios using proven technologies for war fighters and leaders on the job. The automation of such scenario creation, also known as scenario authoring, may enable new scenarios to be rapidly created for virtual and constructive simulations to ensure effectiveness, consistency, completeness and relevance of the scenarios. Currently such scenarios are created in a time-consuming manner, largely with the help of low-level authoring tools that require subject matter experts to import the scenario environment (maps), determine the organization of military units, the kinds of units, their formations, paths for unit movement, SOPs (standard operating procedures to take if an enemy is encountered), and enemy artificial intelligence.

As combat situations and enemy tactics evolve, training and mission rehearsal scenarios may become increasingly important. Conduct and synchronization of the Warfighter Functions are being pushed to lower echelons of responsibility than ever seen before. The pressures on company grade officers and their noncommissioned officers may be greatly increased as they are expected to pursue their assigned missions in the context of the Operational Environment (OE) of a controlling higher headquarters, which may be several echelons above their immediate command structure.

While taught to integrate maneuver considerations into their plans and execution, the requirements for mission success may mean that company grade leaders synchronize less familiar aspects of the mission (e.g., non-kinetic aspects). This growing requirement may place greater demands on officers and non-commissioned officers (NCOs), who usually may have only attended basic leadership and occupational specialty training to fully understand what the higher commander requires for mission success.

Increased sophistication of the mission and mission command at the company echelon may place greater importance on the conduct of mission rehearsal, understanding of the mission and what tasks may be required by the higher commander. Existing approaches for training largely handcraft mission scenarios using any available authoring tools that are available for a targeted tactical simulation. Generally, each scenario may be adapted to a single existing tactical simulation rather than employing the best emerging technology. These mission scenarios are often constructed by contractor personnel incurring added expense and extending the time for the actual development of the scenario significantly.

The tools, techniques and skills required to create virtual and constructive simulation scenarios may be complex and very specific to the simulation tool used. For example, scenarios for the Army's desktop simulation/gaming tool, Virtual Battle Space 2®, or VBS2® for short, may be authored, edited and viewed only within VBS2®. Other simulations, such as TacOps® or Decisive Action® may be developed in the same manner.

Due to the nature of contracted projects, many times the simulation used for development may be restricted to an existing contract vehicle rather than using the simulation that best serves the military, or other, user. The existing approach often limits the ability to create and edit scenarios to military experts who may be proficient with military tactics and the Military Decision Making Process (MDMP) sufficient to understand a commander's intent. In addition, they must also understand a particular tactical simulation's authoring tools.

As such, a need therefore exists to provide rapid scenario generation through automated natural language understanding that allows for a high degree of understanding of what is essential and the nuances required by the commander for mission success. A set of tools, as described in the present disclosure, enables these junior leaders to better prepare themselves for their expanded responsibility and allows them to achieve a higher degree of understanding of what is essential and the nuances required by the commander for mission success.

SUMMARY

A computer-implemented method for scenario generation comprising: receiving an intent within an operation order in a controlled natural language; translating the intent into logic; generating a model generic across simulations based on the logic and at least one of at least one plan template or an automated planning system; and generating at least one executable simulation scenario for a target simulation from the model based on simulation specific adapters.

A system having a suite for receiving an intent written in a controlled natural language within an operations order, the suite processing the intent into a model generic across simulations and translating the model into at least one specific scenario executable by the target simulation.

A rapid scenario generator has at least one processor and a memory operatively coupled to the processor. The memory stores program instructions that when executed by the processor, causes the processor to: receive at least one sketch representing a graphical model of unit relationships; receive an intent within an operational order provided in a controlled natural language; interpret the intent provided in the controlled natural language into logic to generate a model of intent; generate a scenario model generic across simulations and platforms based on the logic and the at least one sketch; and generate at least one executable scenario from the formal scenario model based on simulation specific adapters.

The features, functions, and advantages may be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION

Figure 1:
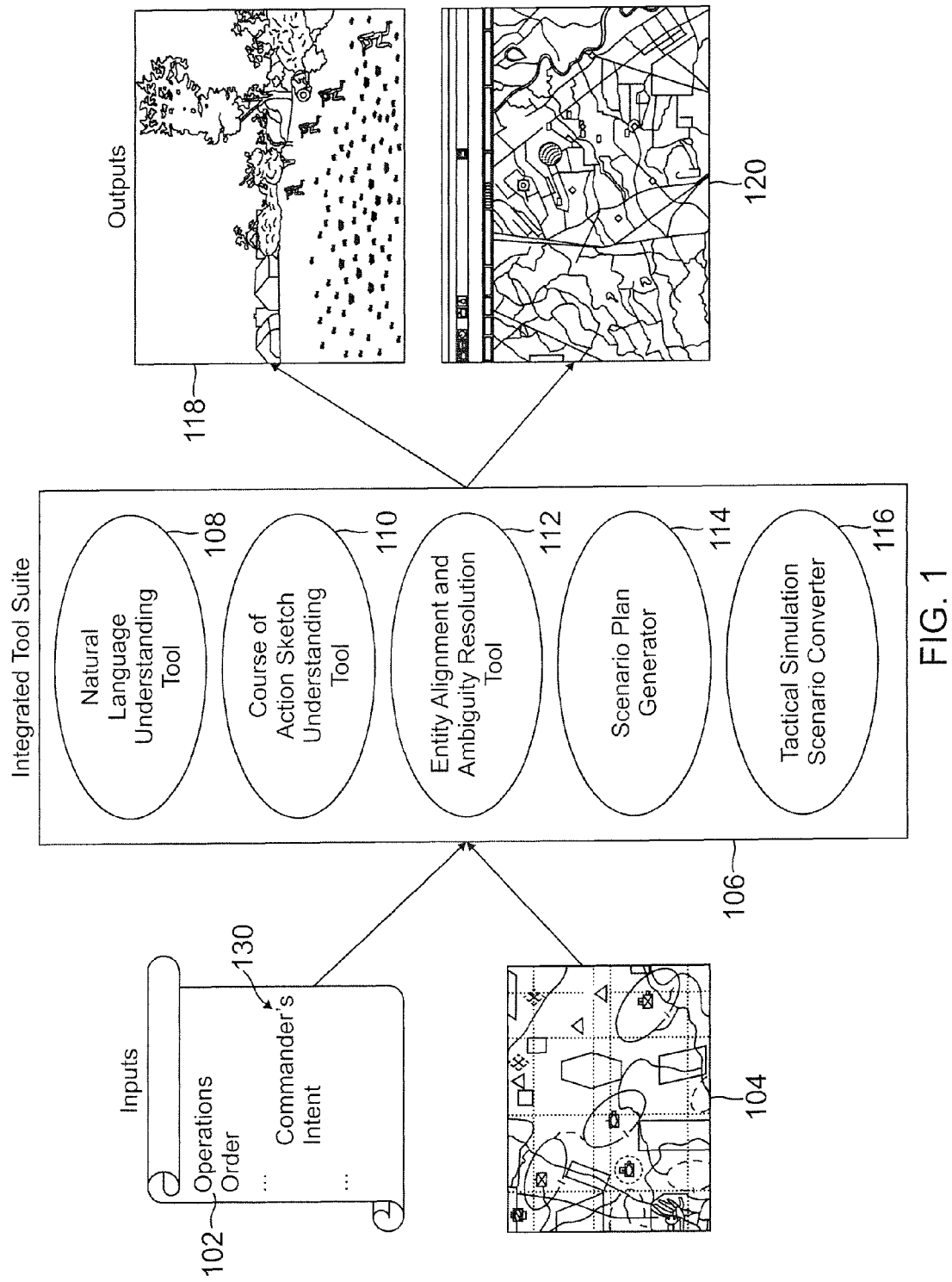
FIG. 1 is a block diagram of an exemplary Integrated Tool Suite for rapid scenario generation using natural language understanding in accordance with one or more aspects of the present disclosure.

Referring to FIG. 1, a block diagram of an exemplary Integrated Tool Suite 106 for rapid scenario generation using natural language understanding in accordance with one or more aspects of the present disclosure is shown. The Suite 106 may provide highly interactive, immersive training, mission rehearsal scenarios and automated assessment that may be created rapidly by war fighters, leaders or others using techniques performed regularly on the job. The Suite 106 may also be referred to as a rapid scenario generator or simply as a generator. Fewer or more components may be provided within the Suite 106.

The automation provided by the Integrated Tool Suite 106 may enable virtual and constructive simulations for training and mission rehearsals to quickly be created and updated to ensure effectiveness, consistency, completeness and relevance. The Suite 106, in one embodiment, may help unit personnel practice their skills through integrated virtual and constructive simulations. The Suite 106 may provide a technical approach for a system agnostic as to tactical simulation or delivery platform that relies on the user's military knowledge rather than mastery of a set of simulation-unique authoring tools to construct a viable scenario for mission rehearsal and training. As stated above, the suite 106 may be used for scenario generation, mission rehearsal, assessment, and in other (e.g., non-military) domains. It should be noted that while mission rehearsal and scenario generation may be related, there are differences between the two terms. Mission rehearsal is a kind of scenario generation. Mission rehearsal may require more specifics as to the information that may be entered in to the suite 106. Mission rehearsal may be generated from instructions provided by a Subject Matter Expert (SME), written in a controlled natural language (CNL), rather than, or in addition to a formal Operation Order (OPORD) and Course of Action (COA) sketch. A COA sketch is generally required but not an OPORD.

As shown in FIG. 1, a number of inputs may be received by the Integrated Tool Suite 106. One input, an operation order 102, may be provided through an interface presented by the Suite 106. The operation order 102 may also be provided as a file which may be downloaded into the Suite 106. The operation order 102 may provide features in which a simulation takes place.

Within the operation order 102, a commander's intent 130 may detail the purpose of the simulation. For example, the commander's intent 130 may partially specify initial, end states, and actions of the simulation. The intent 130 may be written in a controlled natural language. It should be noted that the controlled natural language need not be in English. To some degree, any domain-specific language may be considered a CNL. For example, CNLs may include, but are not limited to: ACE, CPL, PENG, Rabbit, CELT or even CNLs built on, supporting, or derived from, C-BML or MSDL. As input, a course of action sketch 104 may also be provided to the Integrated Tool Suite 106. The sketch 104 may be presented through an interface displayed by the Suite 106. The sketches 104 may represent a graphical model of entity relationships for entities referred to in the operation order 102 and commander's intent 130. Entities can include, but are not limited to units, demarcation markings (e.g., fire control phase lines), intelligence information markings (e.g., SITTEMP), and graphics pertaining to planned operation (e.g., air travel lanes for air assaults), and so on. In other non-military domains, entities can include, but are not limited to, system assemblies, parts, signal flow, hydraulic fluid flow, operating parameters, and so on.

Within the Integrated Tool Suite 106, a Natural Language Understanding Tool 108, Course of Action Sketch Understanding Tool 110, Entity Alignment and Ambiguity Resolution Tool 112, Scenario Plan Generator 114 and Tactical Simulation Scenario Converter 116 may be provided to process the commander's intent 130 within the operation order 102 and the course of action sketches 104. The output of the Suite 106 may be at least one simulation specific to a target simulation and platform, for example, a PC running VBS2® 118 or TacOps® 120. For a tactical simulation, this can be, but is not limited to a mission scenario. For other kinds of simulations, including non-military scenarios, this can be, but is not limited to an instructional scenario of equipment or system operation and problems or tasks that an operator must resolve or carry out.

The Integrated Tool Suite 106 and its components may operate, or run, on a single computing system or server. The Suite 106 may have distributed components where the Natural Language Understanding Tool 108, Course of Action Sketch Understanding Tool 110, Entity Alignment and Ambiguity Resolution Tool 112, Scenario Plan Generator 114 and Tactical Simulation Scenario Converter 116 may be located in different environments and connected through a network. These resources may also be distributed over a cloud. To access those components within the cloud, a computing device may access the cloud which may be maintained by the Suite 106. In one embodiment, the Suite 106 may be located in the cloud.

Using adaptive cognitive instruction techniques, the Integrated Tool Suite 106 may engage the learner in a textual dialogue to determine how well they understand the commander's concept of operation and the intended course of action. The Suite 106 may apply additional questions to determine the learner's understanding of friendly and enemy situations or courses of action through the sketches 104 and ask the learner what they would do and why as part of its assessment capabilities.

The Integrated Tool Suite 106 may generate a simulation scenario for friendly and enemy forces based on the selected course of action, details within the commander's intent 130 and knowledge from the discussion with the learner. The resulting scenario may be used for mission rehearsal and a tactical decision making practice exercise by unit personnel. Alternative courses of action may be programmed to demonstrate the pros and cons of those approaches.

These scenarios may also be used to illustrate new lessons learned from the field during mission pre-deployment training or used by unit personnel to replay National Training Center (NTC) scenarios from previous unit NTC rotations, or used prior to a rotation as part of their preparation for the rotation. This authoring capability may also be used in other ways besides unit training. For example, a field or class instructor may tailor stock scenarios to suit their purposes: a tactical lesson they wish to teach, new lessons learned in the field or adaptation of the setting.

While described as primarily of use in military operations, the Integrated Tool Suite 106 may open the door to other non-training military applications that depend on an ability to automatically interpret military orders or other written specifications (e.g., for tasks to perform, goals to achieve, problems to resolve, constraints to obey, and preferences to consider). The automatic generation of training scenarios in civilian domains such as disaster-support logistics, aircraft equipment operation and control of manufacturing and chemical plant processes may be incorporated into the Suite 106. The interpretation of orders, directives, written procedures, and current operating conditions and objectives in specific technical areas authored in, or understandable by, controlled natural language for the purposes of automating analysis of the plan, procedure, or process described may also be implemented on the Suite 106.

Figure 2:
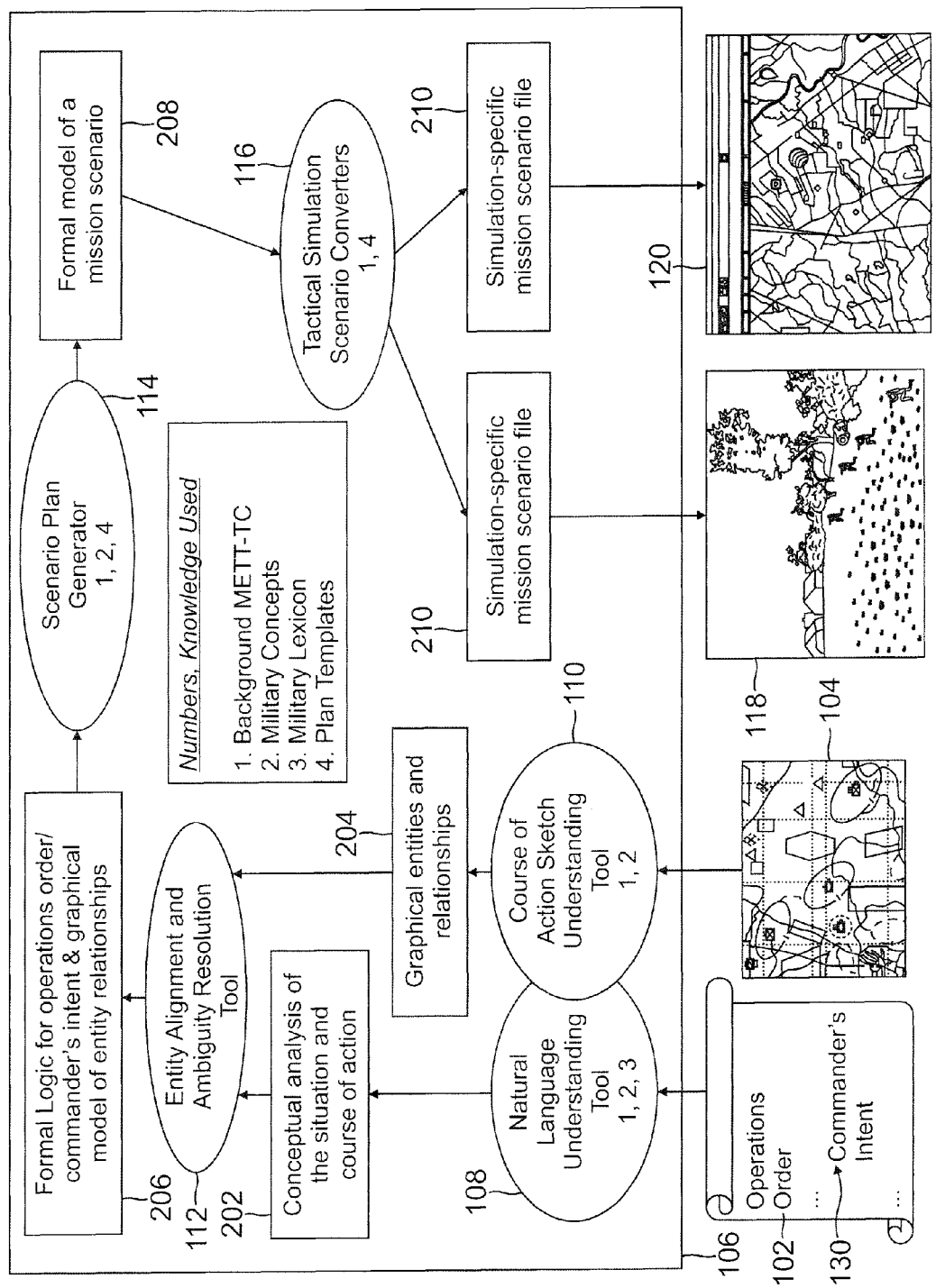
FIG. 2 is a block diagram showing illustrative functions and features of the exemplary Integrated Tool Suite in accordance with one or more aspects of the present disclosure.

FIG. 2 is a block diagram showing illustrative functions and features of the exemplary Integrated Tool Suite 106 in accordance with one or more aspects of the present disclosure. The Suite 106 may include a multi-use set of tools. One set of tools may be used in natural language understanding based learning and assessment tools that focus on the learner's comprehension of the higher commander's intent, its specific tasks and the nuances of the guidance contained within it. The second set of tools may enable automated authoring of a scenario that may then be used for rehearsal by unit personnel to make ready for a pending mission.

The Natural Language Understanding Tool 108 of the Suite 106 may receive the commander's intent 130 within the operation order 102. The commander's intent 130, written in a controlled natural language, C-BML, or MSDL, may be provided as a subset of a natural language. One way to bridge the gap between a natural language and a formal language may be the use of a controlled natural language that may mediate between these languages. Controlled natural languages may be engineered subsets of natural languages where grammar, syntax, and/or vocabulary have been restricted in systematic ways in order to reduce both ambiguity and complexity of full natural languages.

The military strongly encourages use of restricted vocabulary and language to eliminate potential confusion in military orders. These restrictions may, in turn, facilitate the application of a controlled natural language for its interpretation. The controlled natural language may further be used to check the clarity of the commander's intent 130 of an operation order 102, similar to the use of existing grammar checkers to check for proper use of Simplified Technical English (STE).

The commander's intent 130 may be processed by the Natural Language Understanding Tool 108 whereby the Tool 108 interprets the controlled natural language of the commander's intent 130. The Natural Language Understanding Tool 108 may provide for understanding of a commander's intent 130 and author's interpretation. This may require resolving any potential textual ambiguities in context which may be transparently clear for a human. For example, compare the use of "in" in 'defeat in detail', 'in defilade', 'in order to', 'in three hours', 'in company wedge formation', and 'in zone 5'.

The Natural Language Understanding Tool 108 may provide knowledge integration. A military lexicon and concepts may be applied to interpret the commander's intent 130. In one embodiment, the lexicon may include military definitions which may be strictly defined and preferred by officers. A formal representation of concepts that underlie the commander's intent 102 may be included into the lexicon. The Tool 108 may contain an interpreter for the controlled natural language to generate, not just a parse tree, but a formal representation of meaning in the Integrated Tool Suite 106 so that the Suite 106 may understand and reason with the information in, and knowledge inferred from, the intent 130.

This understanding may be improved using inference rules, or other knowledge reasoning approaches, that model military-specific background knowledge. Inferences may be supplemented as needed by information from the author, developer or expert to fill in the implicit knowledge required to construct a formal model of the commander's intent 130. Such information may be required to disambiguate ambiguities in the text of the commander's intent, or where the commander's intent leaves open to interpretation, by subordinate commanders, details of a mission that must be specified in constructing a simulation. The formal model is suitable both for instruction and domain-specific reasoning. After interpretation by the Natural Language Understanding Tool 108, a conceptual analysis of the situation and course of action may be provided to block 202.

A tutor may use the formal commander's intent model as a reference point to assess the learner's understanding of the commander's intent 130. The formal model may be used to evaluate the learner's understanding of the intent 130 at the current level, along with a higher command echelon's intent statement from one and/or two levels higher. Essentially, the tutor may be performing a semantic comparison of two formal models: one extracted from the commander's intent, and possibly augmented by interacting with a subject matter expert, and a second inferred from an interactive dialogue, possibly with graphical input (e.g., selecting units), with the learner. The tutor may engage the learner in dialogue to explore and resolve differences between these two models of the commander's intent 130.

Often times, junior company-grade officers and junior non-commissioned officers at a company post level may have an imperfect understanding of the commander's intent 130, the concept of operations and the commander's selected course of action. These gaps may lead to battle command inefficiencies errors, and in more serious cases, mission failure. The Natural Language Understanding Tool 108 may perform assessments and include tailored coaching, support peer-based learning, and provide remediation, including guidance on how to read and interpret the operation order 102. The preliminary analysis may be on assessing the learner's comprehension and the ability of the learner to think through the tactical ramifications of the commander's intent 130 and selected course of action.

Course of action sketches 104 may be processed by the Course of Action Sketch Understanding Tool 110 of the Integrated Tool Suite 106. The Tool 110 may apply and advance the existing state-of-the-art course of action sketch understanding to generate an ontology of items, or entities, in the sketch 104 and their relationships. A course of action sketch 104 may include a sketch, entity labeling (e.g., unit and phase line names), and a textual statement. The sketch 104 may convey a number of crucial properties of the situation and the plan. It may include a depiction of what terrain features are considered important. The results of analyzing terrain, such as possible paths for movement and good locations for different kinds of operations, may be identified within the sketch 104. The disposition of troops and equipment, both for friendly forces and what is known, or considered likely, about the enemy forces, may be shown within the sketch 104 by unit symbols and a vocabulary of graphical symbols defined as part of a military doctrine. This graphical vocabulary may also include symbols for tasks, such as destroy, defend, attack and so on, which may be interpretable by the Tool 110.

Course of action sketches 104 may tend to be created on pencil and paper or on acetate overlays on maps with grease pencils, post-its, and pushpins. For larger echelons in unhurried situations, PowerPoint® slides may be sometimes generated later for communication. Course of action sketches may also exist in digital form for use by command and control equipment or to provide collaborative planning and situation updating. The course of action sketches 104 may provide a digitalization of the graphical model as mentioned, and may have been entered with graphical user interfaces where that is more natural and time permits, more likely, but not limited to, higher echelons than company-level. Typically, military commanders may develop and communicate battle plans by sketching courses of action. The sketches 104 may depict an area of operations, and may be the result of the latest version in an evolving line of sketching interfaces that commanders find natural and that may support significantly increased automation.

Background Mission, Enemy, Terrain, Troops available, Time and Civil Considerations (METT-TC) along with additional military concepts may be used by the Course of Action Sketch Understanding Tool 110. The METT-TC may be input and be used to prioritize what to analyze during the planning phase of an operation. After processing by the Tool 110, graphical entities and relationships may be formed and provided to block 204.

The Entity Alignment and Ambiguity Resolution Tool 112 may receive the conceptual analysis of the situation and course of action at block 202 and the graphical entities and relationships at block 204. The Tool 112 may align what is in the text within the operation order 102 and the commander's intent 130 and what appears in the graphics of the course of action sketch 104 to resolve discrepancies in the formal understanding. This feature may include matching icon symbols with units mentioned in the commander's intent 130, matching graphic glyphs for actions with textual descriptions, and matching other entities, such as labels, demarcation lines, named objectives, etc. with textual descriptions in the operation order or commander's intent.

Formal logic that combines formal logic from the natural language interpretation of the operation order 102, commander's intent 130, written to box 202 from tool 108, is combined with the formal graphical model of entity relationships obtained in 204, produced by 110, by the Entity Alignment and Ambiguity Resolution Tool 112 with the combined results written as formal logic in block 206. The formal logic may be provided as input for the Scenario Plan Generator 114 of the Integrated Tool Suite 106. The formal logic may be translated into a formal model of a mission scenario that is both independent of any platform or tactical simulation, and congruent with the Operations Order and commander's intent, and provided to block 208. The Generator 114 may use the background METT-TC, military concepts and plan templates to produce this formal model. The formal model may be generic across tactical simulations and delivery platforms.

The Tactical Simulation Scenario Converter 116 may take the formal model from block 208 and translate the generic model into target simulations based on simulation specific adapters that may interpret simulation interpretable instructions that are part of the formal mission scenario model of 208. The Converter 116 may use the background METT-TC and either plan templates or an automated planning system such as Graphplan, or SatPlan, or another planner that solves planning problems represented in a planning language such as STRIPS or PDDL or the like, in this process of down-conversion from a more abstract model to what is required for execution on specific tactical simulations. At blocks 210, simulation-specific mission scenario files may be produced. These files may then be provided to an appropriate target simulation, for example, VBS2® 118, TacOps® 120 or other tactical simulator.

As shown, the semantic understanding of the operation order 102 may be used to create a mission rehearsal scenario that is mapped out into VBS2® 118, TacOps® 120 or other simulation/simulator. Entities such as vehicles or dismounted military teams or the like may be added into the terrain and arrayed into formations after creation. Standard operating procedures (SOPs) may be provided. The course of action sketches 104 may be manipulated and mapped to show new friendly and enemy paths and actions. The Integrated Tool Suite 106 may have the ability to further refine the scenario by using short English commands to specific scenario entities, for example, "Have the machine gun team take a support-by-fire position as the infantry approaches OBJ RED". Additionally, an interactive Graphical User Interface (GUI) may allow a subject matter expert (SME) to easily reposition units or adjust the pathways automatically generated. These refinements allow the SME to improve the educational application of the scenario, more precisely represent recent theater happenings, and further interpret any ambiguity of the operation order 102 that is intended to delegate fine-grained decision-making to lower-level units, and thus does not completely specify all the details of a scenario specific to a tactical simulation and its appearance on a delivery platform such as a smart-phone or a PC.

While simulation-specific mission scenario files, from blocks 210, may have been automatically generated by the Tactical Simulation Scenario Converter 116 of the Integrated Tool Suite 106, the Suite 106 may also provide generic files that may be exported and converted for later use by a specific tactical simulator. The Military Scenario Definition Language (MSDL) may be used to provide a language independent description of scenarios, which may act as additional input, or provided as output to tactical simulations that interpret that language directly. MSDL may be related to the Coalition Battle Management Language (C-BML). The Suite 106 may produce output in MSDL, to describe mission scenarios, and produce course of actions (COAs) in C-BML. MSDL and C-BML may be both amenable to generation from a controlled natural language. The Suite 106 may provide generation of MSDL from an operation order 102. Additionally, both MSDL and C-BML may act as adjuncts to the textual and graphical representation of the operation order. For example, C-BML may provide additional detail describing the current situation, or MSDL may provide constraints or a target scenario to be adjusted to fit the commander's intention and operation order. MSDL and C-BML may also act as an input language to describe plan templates used to generate a formal mission scenario model and to down-translate from that model to executable plans for specific tactical simulations and delivery platforms. In short, MSDL and C-BML may act as an alternate formal model to describe scenarios and plans that complements the internal logical model produced in 202, 204, and 206. They can be used both as auxiliary inputs to 106 or alternate forms of output.

As shown, the Integrated Tool Suite 106 incorporates knowledge integration. Background knowledge may be used to develop inference rules to improve the interpretation and assist in development of natural language and sketch understanding as well as achieve the alignment of textual context within the meaning of the graphic symbology. The background knowledge in this context may be a military lexicon, along with a knowledge base of concepts and rules or axioms that govern their use and relationships. An ontology could provide such a knowledge base. A rule-based system, logic-programming system, or any system that can store logical formulas and reason with them are all examples of alternatives. Ambiguity resolution may be incorporated into the Suite 106 to generate dialogue for eliciting information from the author, or a subsequent user, that cannot be automatically generated from the data provided by the Natural Language Understanding Tool 108 and the Course of Action Sketch Understanding Tool 110.

The generated scenarios may be used for an Army Forces Generation (ARFORGEN) training cycle by unit personnel to replay NTC scenarios from previous unit rotations as part of their preparation. It may also be used to prepare for NTC rotations. This rapid/automated authoring capability may also be used in other unit training exercises. By way of a non-limiting example, a field or class instructor may tailor stock scenarios to suit their purposes: a tactical lesson they wish to teach, new lessons learned in the field or an adaptation of a lesson to the local operating environment.

The demonstrated technical maturity of these features may provide an approach that is low risk while providing a multi-faceted solution for a growing need within the force. The training of junior leaders may be a challenge and one that does not diminish with time. This system may allow unit leadership to better train and rehearse the critical actions required to coordinate the unified action required in the pursuit of missions expected of company echelon actions in the current operating environment. The ability to train and demonstrate the knowledge integration and common-sense reasoning inherent in understanding the commander's intent statement may greatly increase the capability of unit personnel to coordinate and control unit operations. Even if needs for counter-insurgency training decrease, and needs for mid- to high-intensity warfare training increase, officers need to be able to accurately interpret operation orders and to understand the commander's intent. An automated tool that generates such an understanding remains useful for rapid scenario generation as a tool to support decision-making for command and control applications.

The Integrated Tool Suite 106 may include an integration of natural language and sketch understanding to provide an in-depth commander's intent model. Knowledge integration with background tactical knowledge and lexical concepts may support multiple kinds of applications, including both instructional dialogue and automated scenario construction. At the same time, the state-of-the-art yet practical work that is addressed may be a key need for improving the ability to achieve unified action by junior company-grade officers and NCOs, although additional needs may evolve over time.

Figure 3:
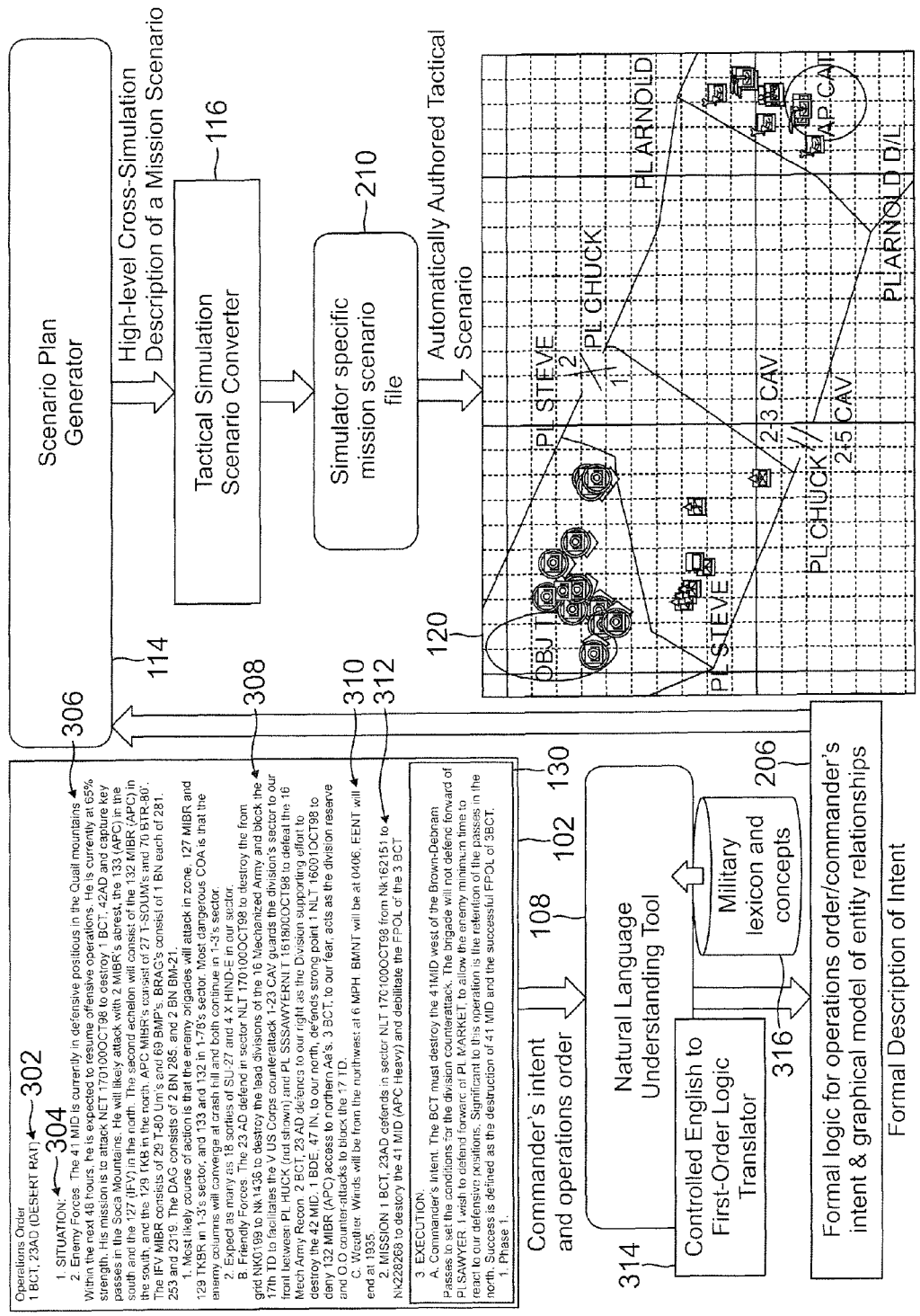
FIG. 3 is a block diagram showing a commander's intent within an operation order provided into the exemplary Integrated Tool Suite to generate a tactical scenario in accordance with one or more aspects of the present disclosure.

FIG. 3 is a block diagram showing a commander's intent 130 within an operation order 102 provided into the exemplary Integrated Tool Suite 106 to generate a tactical scenario in accordance with one or more aspects of the present disclosure. The Suite 106 may be combined with state-of-the-art tools to create an automated rapid prototyping tool that interprets the intent 130 from the operation order 102 and a course of action sketch 104 to generate scenarios for training or mission rehearsal.

The operation order 102 and commander's intent 130 may be written in English sentences using traditional punctuation and grammar. A unit name 302 may be associated with the operation order 102, for example, "1 BCT, 23AD (DESERT RAT)", which may describe one or more units that may appear in the associated graphics and the final tactical simulation produced. The unit names in the graphics may describe aggregates of units that need to be depicted individually in the simulation scenario. For example, a platoon or battery may need to be depicted as individual soldiers and their equipment in a simulation scenario for VBS2, or as lower-level units, such as squads or teams, in a scenario for a constructive simulation such as Decisive Action. The operation order 102 and commander's intent 130 may be provided through a text file or entered within a user interface provided by the Integrated Tool Suite 106.

Within the operation order 102, a situation 304 in which the scenario takes place may be described. The situation 304, in one embodiment, may include information about enemy forces 306 and friendly forces 308 arrayed within the scenario that a simulation runs. For each of the forces 306 and 308, descriptors may be added showing how many units are in place, strength levels, troops, defensive positions, offensive positions, etc. Course of actions and sorties may also be described. Weather 310 and mission statements 312 may be incorporated into the situation 304 of the operation order 102. Key information typically present in the sketch accompanying the operational order may include the known locations of friendly units and what is known of the enemy units' locations, phase lines delimiting areas of operation, fire control, and allowed aircraft sorties, and expected enemy dispositions or course of actions provided by a battalion intelligence officer (S-2).

Within the operation order 102, the commander's intent 130 may state a purpose for the scenario. As shown in FIG. 3, the intent 130 may specify:

The BCT must destroy the 41MID west of the Brown-Debnam Passes to set the conditions for the division counterattack. The brigade will not defend forward of PL SAWYER. I wish to defend forward of PL MARKET, to allow the enemy minimum time to react to our defensive positions. Significant to the operation is the retention of the passes in the north. Success is defined as the destruction of 41 MID and the successful FPOL of 3BCT.

The commander's intent 130 may be received by the Natural Language Understanding Tool 108. The controlled natural language of the intent 130 may fall into two major types: those that improve readability for human readers (for example, non-native speakers) and those that enable reliable automatic semantic analysis of the language.

The first types of languages are often called "simplified" or "technical" languages. Examples of these may include ASD Simplified Technical English, Caterpillar Technical English, and IBM's Easy English. These languages may restrict the writer by general rules such as "Keep sentences short", "Avoid the use of pronouns", "Only use dictionary-approved words", and "Use only the active voice" and may be used by the CNL of the commander's intent 130.

The second types of languages for the commander's intent 130 may have a formal logical basis, that is, they have a formal syntax and semantics and may be mapped to an existing formal language such as first-order logic shown at block 314. Those languages may be used as knowledge-representation languages and writing of those languages is supported by fully automatic consistency and redundancy checks, query answering, etc. Controlled natural languages may also blend features of both kinds of approaches, e.g., simplifying language for human readability and translation may also simplify the ability of the language to be translated into formal logic, and vice versa.

Formal logic notation may be cryptic and incomprehensible to subject matter experts and casual users unschooled in its use. Army soldiers and officers may be unfamiliar with these formal languages; instead, they are experts in areas such as tactics, weapons, military history, and leadership. A controlled natural language of the commander's intent 130 may allow both subject matter experts and casual users to understand knowledge-base descriptions and procedures. Both may be able to understand and query a knowledge base expressed with a controlled natural language, without needing to learn a formal query language such as SQL. The subject matter expert may directly enter new knowledge into the knowledge base using the controlled natural language and see inferences from new knowledge immediately. Information in the knowledge base, including deductive rules or constraints, can be rendered into English, using the controlled natural language. The knowledge base may be expressed in the controlled natural language, a subset of English, using the military lexicon and concepts 316. Internally, the knowledge base may take the form of a database or ontology. Taken together these advantages may make knowledge-based applications more transparent, easier to work with and easier to develop. The knowledge encoded in the knowledge bases may be further leveraged to provide knowledge capture of departing experts, including officers rotating out of positions or retiring, and to provide support for decision-making tools in command and control applications.

After the operation order 102 having the commander's intent 130 is processed by the Natural Language Understanding Tool 108 of the Integrated Tool Suite 106, formal logic may be provided to block 206. The formal logic may provide a formal description of the intent 130. The Scenario Plan Generator 114 may take the formal logic and process it into a high-level cross-simulation description of a mission scenario. The scenario provided by the Scenario Plan Generator 114 may be generic across tactical simulations based on the formal logic and the application of one or more plan templates, or an automated planner, to generate the abstract scenario description.

The Tactical Simulation Scenario Converter 116 of the Integrated Tool Suite 106 may be used to take the generic scenario and produce more specific scenarios. The converter 116 may provide a simulator specific mission scenario file to block 210 for use with a specific simulator, which is shown as simulation 120. Examples of simulators may include, but are not limited to: TacOps®; ATF®, BCT® and other simulations from ProSimCo®; Decisive Action; and the like. The generic scenario may be converted based on simulation specific adapters. The resulting scenarios may be used for mission rehearsal and tactical decision making practice exercises by unit personnel or to illustrate new lessons learned from the theater of operations during mission pre-deployment training.

Through the Integrated Tool Suite 106, a modular set of integrated prototype tools for automated/rapid tactical simulation scenario creation from a commander's intent 130, concept of the operation and associated course of action (COA) sketches 104 may be provided. Soldiers, or other personnel, may be able to hone their skill at identifying and performing the key tasks required to achieve their mission objectives.

A dialogue may be generated to elicit information from the author/developer that cannot be automatically generated from the data provided. The integrated Tool Suite 106 may provide dynamic tutorial dialogue, explanatory reasoning, mixed-initiative conversational dialogues and interactive tutoring with the learner for improved comprehension using natural language understanding and other proven state-of-the-art techniques. The Suite 106 may also incorporate an intelligent tutoring system and adaptive training by applying coaching and student modeling to improve the knowledge integration, the selection of scenarios or tactical problems, and discourse generation for knowledge elicitation and instruction.

Figure 4:
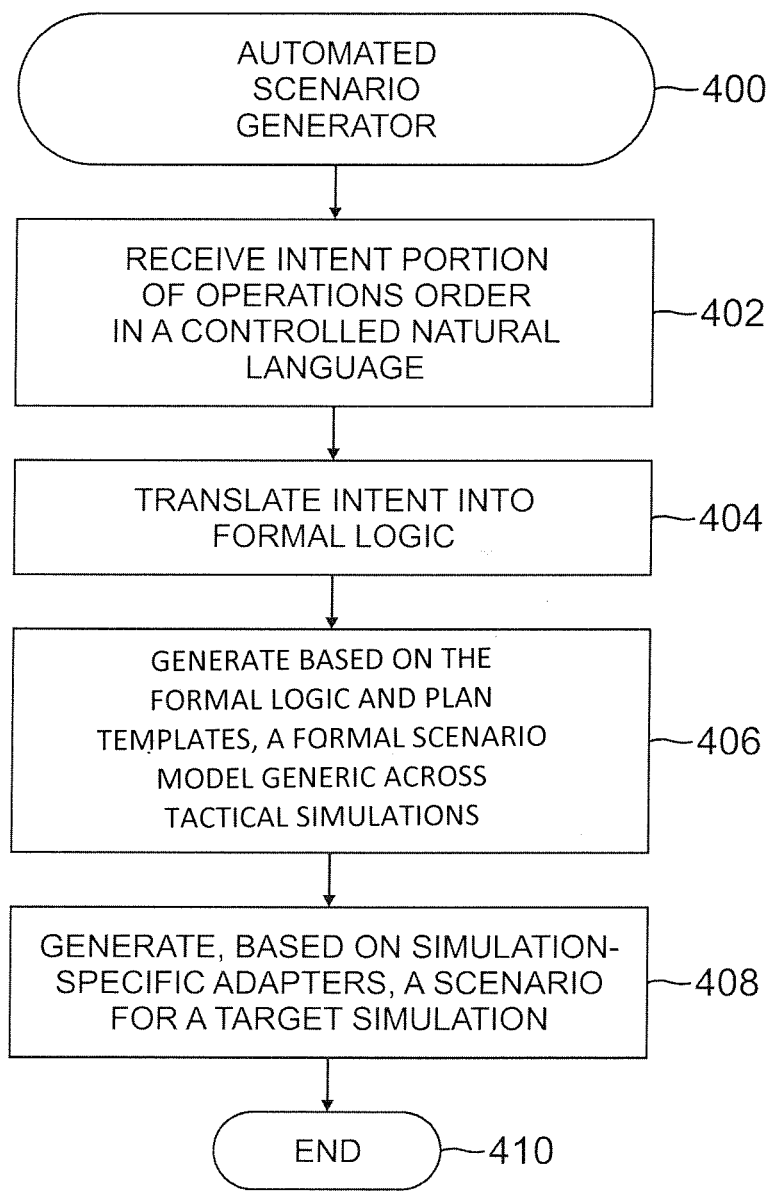
FIG. 4 is a flow chart providing exemplary processes for automatic scenario generation in accordance with one or more aspects of the present disclosure.

Turning now to FIG. 4, a flow chart providing exemplary processes for automatic scenario generation in accordance with one or more aspects of the present disclosure is shown. The processes may begin at block 400. At block 402, the Integrated Tool Suite 106 may receive an intent portion 130 of the operation order 102 in a controlled natural language. The intent 130 may be received by the Natural Language Understanding Tool 108.

At block 404, the commander's intent 130 may be translated or processed into formal logic, as described above. The formal logic may be the interpreted output of the Natural Language Understanding Tool 108. During this time, the Course of Action Sketch Understanding Tool 110 of the Integrated Tool Suite 106 may be used to interpret incoming course of action sketches 104. The combination and alignment of the entities in the commander's intent 130 and the sketches 104 may be reconciled in the Suite 106 by the Entity Alignment and Ambiguity Resolution Tool 112.

At block 406, the Scenario Plan Generator 114 may generate, based on the formal logic and one or more plan templates, a formal scenario model that may be generic across tactical simulations. Appropriate plan templates may be suggested from the interpretations of course of action sketches 104 and the operational order 102, or an automated planner may apply objectives, constraints, and a world model derived from the interpretation of 104 and 102. The Tactical Simulation Scenario Converter 116, at block 408, may then be used to down convert the formal scenario model for a specific target simulation into simulation interpretable instructions, such as a script, or more detailed executable code. The processes may end at block 410. Alternatively, output can be in C-BML and MSDL, which are evolving (currently proposed) standards for communicating orders, plans, and scenario descriptions.

Figure 5:
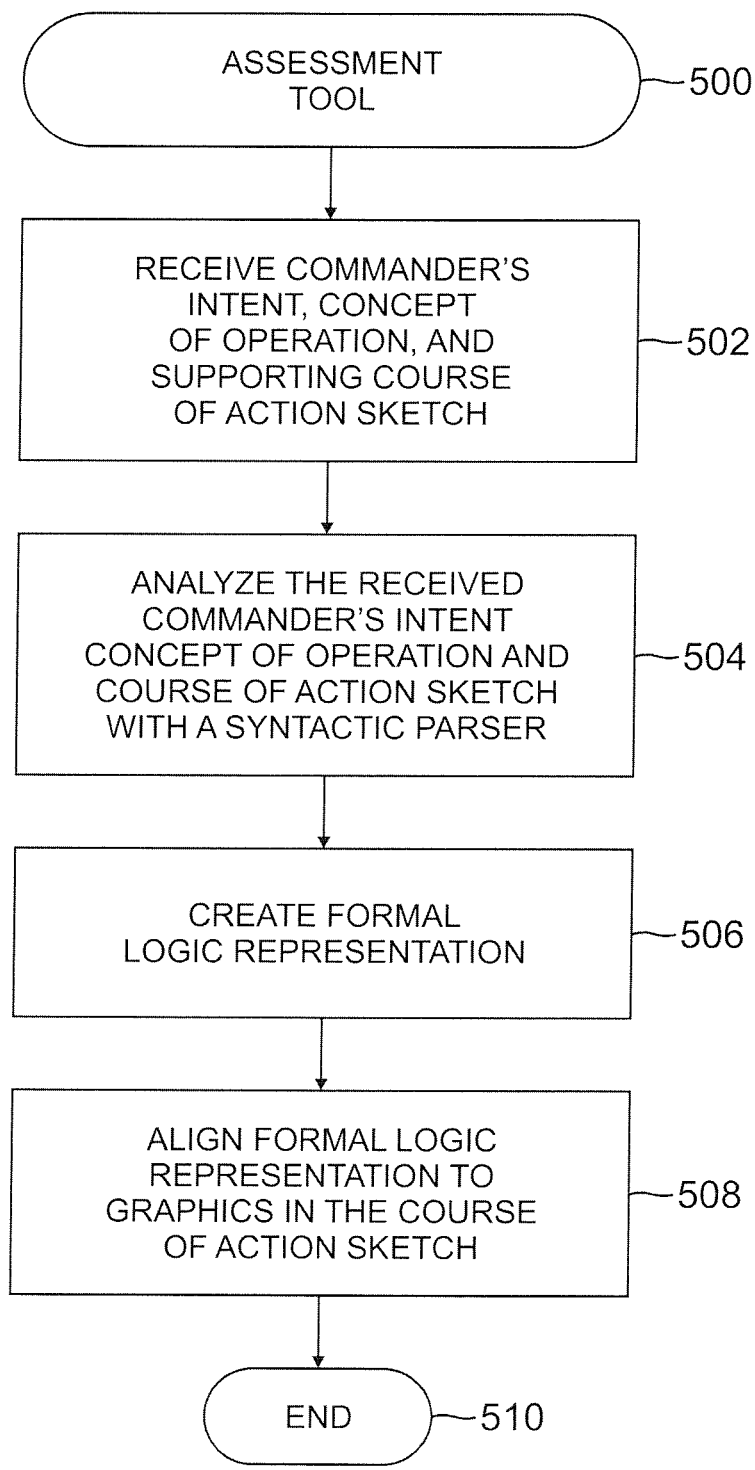
FIG. 5 is a flow chart providing exemplary processes for an assessment tool in accordance with one or more aspects of the present disclosure.

FIG. 5 is a flow chart providing exemplary processes for an assessment tool in accordance with one or more aspects of the present disclosure. The processes may begin at block 500. At block 502, the Natural Language Understanding Tool 108 may receive the commander's intent 130 and concept of operation, while the Course of Action Sketch Understanding Tool 110 may receive a supporting sketch 104.

At block 504, the Natural Language Understanding Tool 108 and the Course of Action Sketch Understanding Tool 110 may analyze the received commander's intent 130, concept of operation and course of action sketch 104 with a syntactic parser. A translation mechanism may be used that translates the parse results to formal logic where the terms of the formulas may be taken from target ontologies, such as WordNet, the military lexicon, the military concept ontologies, and the like. The Scenario Plan generator 114 may then create a formal logic representation of the written text at block 506. Due to ambiguities, inaccuracies, and differences in the units depicted between the operational order and course of action sketch, the Entity Alignment and Ambiguity Resolution tool 112 of the Integrated Tool Suite 106 may align the formal logic representation to the formal representation of the graphics in the course of action sketch 104. The processes may end at block 508.

Figure 6:
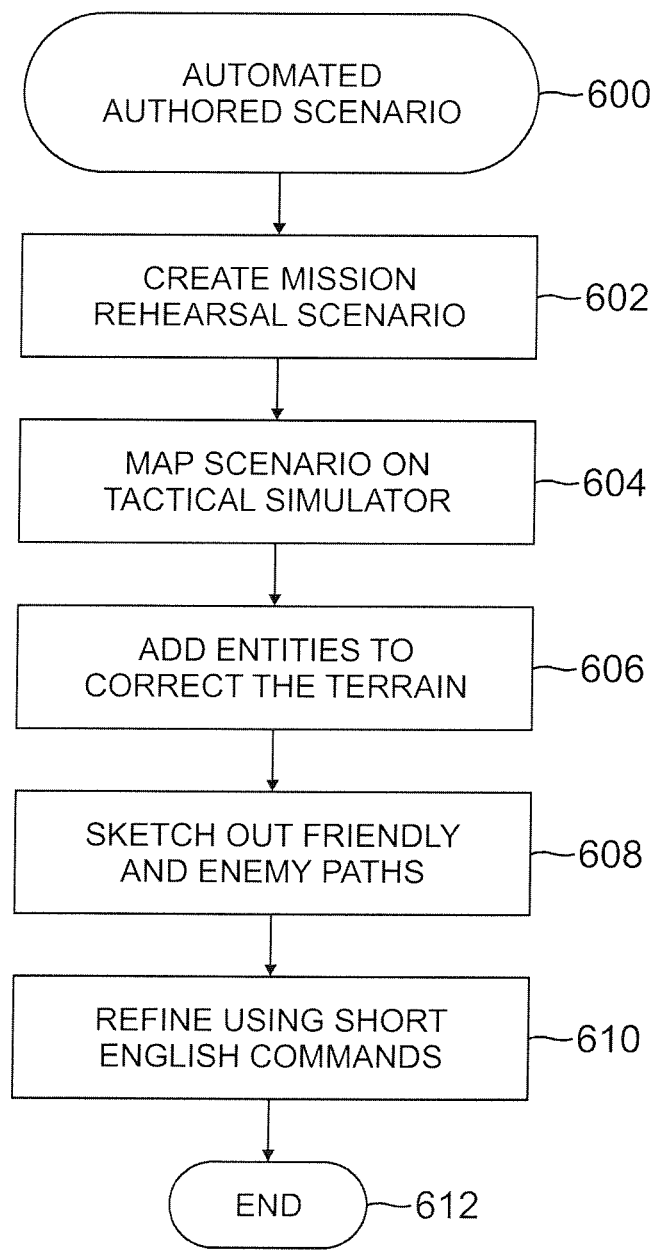
FIG. 6 is a flow chart providing exemplary processes for automated authoring of a scenario in accordance with one or more aspects of the present disclosure.

FIG. 6 is a flow chart providing exemplary processes for automated authoring of a scenario in accordance with one or more aspects of the present disclosure. The processes may begin at block 600. At block 602, the Scenario Plan Generator 114 may take the formal model described above and create a mission rehearsal scenario. The scenario may be mapped to a tactical simulator at block 604. The user of the Integrated Tool Suite 106 may refine the automatically generated mission rehearsal scenario, for example, by adding or moving units, or modifying the terrain, weather, etc. at block 606. This may include adding additional units such as soldiers and vehicles, or changing kinds of units, formations, or SOPs. In one embodiment, this may include manipulating the landscape provided within the course of action sketch 104. These changes may reflect new lessons learned from the tactical environment, such as changes in the mission weather, enemy weapons, unit sizes, enemy tactics, friendly forces available, and so on.

At block 608, the Integrated Tool Suite 106 may allow the user to sketch out friendly and enemy paths if they were not defined in the course of action sketch 104. A number of tools may be provided that would allow correct path definitions, such as graphical interfaces. At block 610, the scenario may be refined using short English commands along with GUI commands to drag units, move waypoints on pathways, and so on. The processes may end at block 612.

Figure 7:
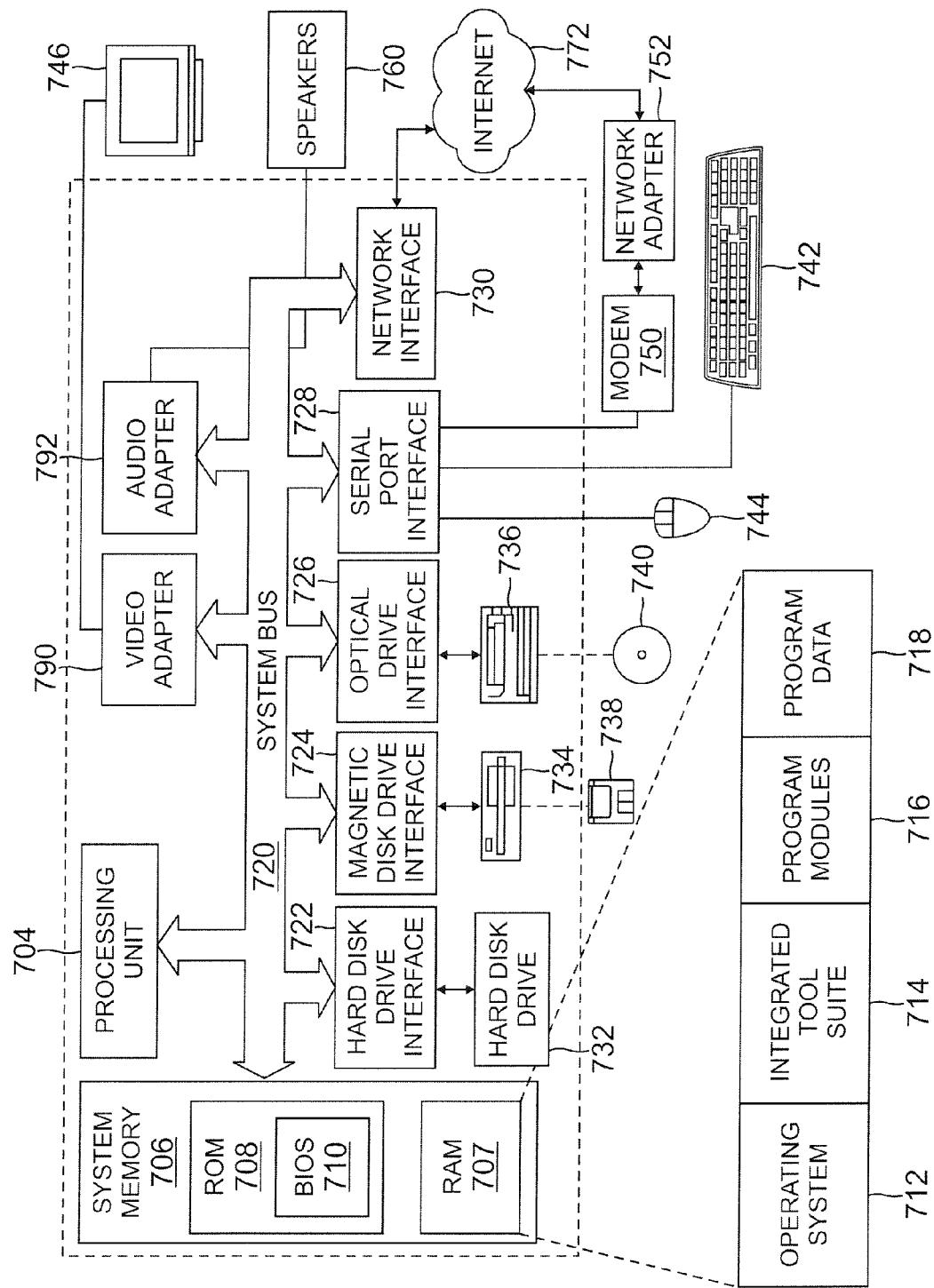
FIG. 7 is a block diagram showing exemplary hardware and software in which the exemplary Integrated Tool Suite may be operated on in accordance with one or more aspects of the present disclosure.

FIG. 7 is a block diagram showing exemplary hardware and software in which the exemplary Integrated Tool Suite 106 may be operated on in accordance with one or more aspects of the present disclosure. The Suite 106 may be provided on a computing system. The hardware may include a processing unit 704, a system memory 706 and a system bus 720 that operatively couples various system components including the system memory 706 to the processing unit 704. There may be only one or there may be more than one processing unit 704, such that the processor or computing system includes a single central processing unit (CPU), or a plurality of processing units, commonly referred to as a parallel processing environment. The computing system may be a conventional computer, a distributed computer, a web server, a file server, a mobile platform such as a smart phone, a self-contained unit and any other type of computer.

The system bus 720 may be any of several types of bus structures including a memory bus or memory controller, a peripheral bus, a switched fabric, point-to-point connections and a local bus using any of a variety of bus architectures. The system memory 706 may also be referred to as simply the memory and may include read only memory (ROM) 708, random access memory (RAM), along with non-volatile, persistent storage in the form of additional storage devices such as optical disks, cloud storage, flash sticks, and the like 707. A basic input/output system (BIOS) 710, containing the basic routines that help to transfer information between elements within the computing system, such as during start-up, may be stored in ROM 708. The computing system may further include a hard disk drive 732 for reading from and writing to a hard disk, not shown, a magnetic disk drive 734 for reading from or writing to a removable magnetic disk 738 and an optical disk drive 736 for reading from or writing to a removable optical disk 740 such as a CD ROM, DVD, or other optical media.

The hard disk drive 732, magnetic disk drive 734, and optical disk drive 736 may be connected to the system bus 720 by a hard disk drive interface 722, a magnetic disk drive interface 724 and an optical disk drive interface 726, respectively. The drives and their associated computer-readable media provide nonvolatile storage of computer-readable instructions; data structures, for example, a catalog and a contextual-based index; program modules, for example, a web service and an indexing robot; and other data for the computing system. It should be appreciated by those skilled in the relevant art that any type of computer-readable medium that may store data that is accessible by a computer, for example, magnetic cassettes, flash memory cards, digital video disks, and different varieties of RAM and ROM may be used in the exemplary operating environment.

A number of program modules may be stored on the hard disk drive 732, magnetic disk 738, optical disk 740, ROM 708, or RAM 707, including an operating system 712, Integrated Tool Suite 714, other program modules 716, and program data 718. A user may enter commands and information into the computing system through input devices such as a keyboard 742 and pointing device 744, for example, a mouse. Other input devices (not shown) may include, for example, a microphone, a joystick, a game pad, a tablet, a touch screen device, a satellite dish, a scanner, a facsimile machine and a video camera. These and other input devices are often connected to the processing unit 704 through a serial port interface 728 that is coupled to the system bus 720, but may be connected by other interfaces, such as a parallel port, game port or a universal serial bus (USB).

A monitor 746 (one or more) or other type of display device (e.g., the screen on a smart phone) may also be connected to the system bus 720 via an interface, such as a video adapter 790. The monitor 746 may be in the form of a touch screen device removing the need for any input devices for pointing. In addition to the monitor 746, computers may include other peripheral output devices, such as a printer and speakers 760. The speakers 760 may be connected into the computing system through an audio adapter 792. These and other output devices are often connected to the processing unit 704 through the serial port interface 728 that is coupled to the system bus 720, but may be connected by other interfaces, such as a parallel port, game port, a universal serial bus (USB), FireWire, and the like.

The computing system may operate in a networked environment using logical connections to one or more remote computers. These logical connections may be achieved by a communication device coupled to or integral with the computer system. Examples of connections are via the Internet, internal LAN, and physical systems from copper to fiber-optics to satellite, etc. The remote computer may be a server, a router, a network personal computer, a client, a peer device, or other common network node, and often includes many or all of the elements described above. The computing system may be logically connected to the Internet 772. The Internet 772 may be interchanged with a local area network (LAN), wide area network (WAN), personal area network (PAN), campus area network (CAN), metropolitan area network (MAN), global area network (GAN), or the Defense Department's Global Information Grid (GIG). Such networking environments are commonplace in office networks, enterprise-wide computer networks, intranets and the Internet, which are all types of networks.

When used in a LAN environment, the computing system may be connected to the local network through a network interface or adapter 730, which is one type of communication device. When used in a WAN environment, the computing system typically includes a modem 750, a network adapter 752, or any other type of communications device for establishing communications over the WAN. The modem 750, which may be internal or external, is connected to the system bus 720 via the serial port interface 728. In a networked environment, program modules depicted relative to the computing system, or portions thereof, may be stored in a remote memory storage device. It is appreciated that the network connections shown are exemplary and other means of and communications devices for establishing a communications link between the computers may be used.

The technology described herein may be implemented as logical operations and/or modules. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying environment in which the described disclosure is implemented. The logical operations making up the embodiment of the disclosure described herein are referred to variously as software operations, programs, program steps, objects, or modules. It should be understood that logical operations may be performed in any order, unless explicitly claimed otherwise or a specific order is inherently necessitated by the claim language.

Various embodiments of the present disclosure may be programmed using an object-oriented programming language, such as SmallTalk, Java, C++, Ada, or C#. Other object-oriented programming languages may also be used. Alternatively, functional, scripting, and/or logical programming languages may be used, including Python, LISP, and Prolog. Various aspects of this disclosure may be implemented in a non-programmed environment, for example, documents created in HTML, XML, or other format that, when viewed in a window of a browser program, render aspects of a GUI or perform other functions. Various aspects of the disclosure may be implemented as programmed or non-programmed elements, or any combination thereof.

In software implementations, computer software and/or data is stored on a machine readable medium as part of a computer program product, and is loaded into a computer system or other device or machine via a removable storage drive, hard drive, or communications interface. Computer programs, also called computer control logic or computer readable program code, are stored in a main and/or secondary memory, and executed by one or more processors, controllers, or the like to cause the one or more processors to perform the functions of the disclosure as described herein.

The figures and examples above are not meant to limit the scope of the present disclosure to a single embodiment, as other embodiments are possible by way of interchange of some or all of the described or illustrated elements. Moreover, where certain elements of the present disclosure may be partially or fully implemented using known components, only those portions of such known components that are necessary for an understanding of the present disclosure are described, and detailed descriptions of other portions of such known components are omitted so as not to obscure the disclosure. In the present disclosure, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

While embodiments of the disclosure have been described in terms of various specific embodiments, those skilled in the art will recognize that the embodiments of the disclosure may be practiced with modifications within the spirit and scope of the claims.

What is claimed is:

1. A rapid scenario generator comprising:
   at least one processor; and
   a memory operatively coupled to the processor, the memory storing program instructions that when executed by the processor, causes the processor to:
   receive an intent within an operation order in a controlled natural language;
   enter a graphical model of the intent and the operation order;
   resolve discrepancies between the intent, operation order and graphical model;
   translate the intent into logic;
   generate a model generic across simulations based on the logic and at least one of at least one plan template or an automated planning system; and
   generate at least one executable simulation scenario for a target simulation from the model based on simulation specific adapters.

2. The rapid scenario generator of claim 1, wherein the at least one plan template comprises a user generated template.

3. The rapid scenario generator of claim 1, wherein receiving the intent within the operation order comprises acquiring at least one of a file having the operation order, a transmission having the operation order, or accepting manual input of the operation order.

4. The rapid scenario generator of claim 1, wherein translating the intent into the logic comprises applying a lexicon and parser to the controlled natural language of the intent through an interpreter.

5. The rapid scenario generator of claim 1, wherein generating the model comprises examining Mission, Enemy, Terrain, Troops available, Time and Civilian Considerations.

6. The rapid scenario generator of claim 1, wherein generating the at least one simulation comprises creating one of a mission scenario file, or providing instructions in real time, for the at least one simulation.

7. The rapid scenario generator of claim 1, comprising generating simulation interpretable instructions for the at least one simulation based on the simulation specific adapters.

8. The rapid scenario generator or claim 7, wherein generating the simulation interpretable instructions comprises creating scripts, initial conditions and authored initial situations.

9. The rapid scenario generator of claim 7, comprising providing the simulation interpretable instructions to one of the at least one simulation, or to a standards-based language that can specify a simulation scenario.

10. The rapid scenario generator of claim 9, wherein providing the simulation interpretable instructions to the at least one simulation comprises supplying the simulation interpretable instructions to at least one of a training scenario, a mission rehearsal scenario, or a scenario intended to assess learner performance, understanding, or capability.

11. The rapid scenario generator of claim 1, wherein generating the at least one executable simulation scenario for a target simulation from the model based on the simulation specific adapters comprises applying at least one of tactical, system and device software adapters specific to at least one simulation.

12. A rapid scenario generator comprising:
    at least one processor; and
    a memory operatively coupled to the processor, the memory storing program instructions that when executed by the processor, causes the processor to:
    receive an intent within an operational order provided in a controlled natural language;
    enter at least one sketch of a graphical representation of the intent and the operation order, the at least one sketch representing a terrain of operation and resources involved;
    resolve discrepancies between the intent, operation order and sketch;
    interpret the intent provided in the controlled natural language into logic to generate a model of intent;

generate a scenario model generic across simulations and platforms based on the logic and the at least one sketch; and generate at least one executable scenario from the formal scenario model based on simulation specific adapters.

13. The rapid scenario generator of claim 12, wherein generating the at least one executable scenario comprises determining at least one of vehicle placements, formation selections, fire missions, path routings, standard operating procedures (SOPs), and course of actions consistent with the intent.

14. The rapid scenario generator of claim 12, wherein the controlled natural language comprises one of a restricted vocabulary, restricted syntax, restricted word meanings, or combination thereof.

15. The rapid scenario generator of claim 14, wherein the restricted vocabulary comprises a military lexicon and a subset of concepts that capture the commander's intent.

* * * * *